(12) United States Patent
Chang et al.

(10) Patent No.: US 11,553,096 B2
(45) Date of Patent: Jan. 10, 2023

(54) FLIP-COVER MULTIFUNCTIONAL IMAGE FORMING DEVICE

(71) Applicant: AVISION INC., Hsinchu (TW)

(72) Inventors: Min-Hao Chang, Taipei (TW); Hung-Chih Lee, Hsinchu County (TW); Chao-Yu Peng, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 17/482,454

(22) Filed: Sep. 23, 2021

(65) Prior Publication Data

US 2022/0159136 A1 May 19, 2022

(30) Foreign Application Priority Data

Nov. 17, 2020 (TW) ................................. 109140003

(51) Int. Cl.
*H04N 1/00* (2006.01)
(52) U.S. Cl.
CPC ..... *H04N 1/00538* (2013.01); *H04N 1/00551* (2013.01); *H04N 1/00655* (2013.01)
(58) Field of Classification Search
None
See application file for complete search history.

(56) References Cited

U.S. PATENT DOCUMENTS

| 2007/0195381 | A1* | 8/2007 | Yamazaki | H04N 1/00559 |
| | | | | 358/502 |
| 2010/0158560 | A1* | 6/2010 | Watanabe | G03G 21/1633 |
| | | | | 399/110 |
| 2020/0329163 | A1* | 10/2020 | Sheng | H04N 1/00557 |

FOREIGN PATENT DOCUMENTS

| JP | 2007139902 A | * | 6/2007 |
| JP | 2007156360 A | * | 6/2007 |
| TW | 200505319 | | 2/2005 |
| TW | M503039 U | | 6/2015 |

OTHER PUBLICATIONS

JP Publication No. 2007156360-A (English Translation) (Year: 2007).*
JP Publication No. 2007139902-A (English Translation) (Year: 2007).*

* cited by examiner

*Primary Examiner* — Miya J Williams
*Assistant Examiner* — Miya J Cato
(74) *Attorney, Agent, or Firm* — Winston Hsu

(57) ABSTRACT

A flip-cover multifunctional image forming device includes a lower body, a first image forming module, a cover body, at least one pivoting mechanism, an upper body and a second image forming module. The first image forming module is disposed inside the lower body. The at least one pivoting mechanism is connected to the lower body and the cover body and for pivoting the cover body relative to the lower body between a folded position and an unfolded position. The upper body is detachably disposed on a side of the cover body away from the lower body. The upper body is driven by the cover body to move relative to the lower body when the cover body pivots relative to the lower body. The second image forming module is disposed inside the upper body. The present invention has advantages of simple structure, easy operation and flexibility in use.

11 Claims, 10 Drawing Sheets

FLIP-COVER MULTIFUNCTIONAL IMAGE FORMING DEVICE

BACKGROUND OF THE DISCLOSURE

1. Field of the Disclosure

The present invention relates to an image forming device, and more specifically, to a flip-cover multifunctional image forming device.

2. Description of the Prior Art

With advancement of scanning technology, scanners are widely used in homes or offices for capturing images of physical objects, such as documents, photographs or books. The captured digital images can be displayed and stored in computer devices. The digital images of the physical objects can be stored permanently, so that it is not required to store the physical objects anymore, which can save space occupied by the physical objects. Furthermore, it is easy for a user to edit or transfer the images. Therefore, the scanners have an extensive range of applications. However, there is still a need to provide an improved image forming device to meet different users' demands.

SUMMARY OF THE DISCLOSURE

Therefore, it is an objective of the present invention to provide a flip-cover multifunctional image forming device for solving the aforementioned problem.

In order to achieve the aforementioned objective, the present invention discloses a flip-cover multifunctional image forming device. The flip-cover multifunctional image forming device includes a lower body, a first image forming module, a cover body, at least one pivoting mechanism, an upper body, and a second image forming module. The first image forming module is disposed in the lower body. The at least one pivoting mechanism is connected to the lower body and the cover body and for pivoting the cover body relative to the lower body between a folded position and an unfolded position. The upper body is detachably disposed on a side of the cover body away from the lower body. The upper body is driven by the cover body to move relative to the lower body when the cover body pivots relative to the lower body. The second image forming module is disposed in the upper body.

According to an embodiment of the present invention, a protruding border is formed on the cover body, and a restraining space is enclosed by the protruding border and configured to accommodate a bottom portion of the upper body to restrain a movement of the upper body relative to the cover body.

According to an embodiment of the present invention, a height of a first portion of the protruding border adjacent to the at least one pivoting mechanism is greater than a height of a second portion of protruding border away from the at least one pivoting mechanism.

According to an embodiment of the present invention, a recess is formed on the cover body, and the protruding border is located on an outer periphery of the recess.

According to an embodiment of the present invention, a recess is formed on the cover body, and the protruding border is located on an outer periphery of the recess.

According to an embodiment of the present invention, the flip-cover multifunctional image forming device further includes at least one abutting component detachably disposed on a lateral side of the lower body, and the at least one abutting component abuts against the upper body or the cover body when the cover body is pivoted relative to the lower body to the unfolded position.

According to an embodiment of the present invention, an abutting slanted surface is formed on the at least one abutting component, and the abutting slanted surface abuts against the upper body when the cover body is pivoted relative to the lower body to the unfolded position.

According to an embodiment of the present invention, an installation protrusion protrudes from the at least one abutting component. An installation notch is formed on the lateral side of the lower body, and the installation protrusion detachably engages with the installation notch.

According to an embodiment of the present invention, the cover body includes a first cover portion and a second cover portion detachably installed on a side of the first cover portion adjacent to the lower body.

According to an embodiment of the present invention, at least one through hole is formed on the first cover portion. The second cover portion covers the at least one through hole when the second cover portion is installed on the side of the first cover portion adjacent to the lower body. The flip-cover multifunctional image forming device further includes at least one fastening component, and the at least one fastening component passes through the at least one through hole to fasten the upper body onto a side of the first cover portion away from the lower body.

According to an embodiment of the present invention, a scanning platform is formed on a side of the lower body adjacent to the cover body, and the first image forming module is a flatbed scanner and configured to capture an image of a scanned object placed on the scanning platform.

According to an embodiment of the present invention, a medium passage is formed in the upper body, and the second image forming module is an automatic document feeder scanner and configured to capture an image of a scanned object passing through the medium passage.

According to an embodiment of the present invention, a medium passage is formed in the upper body, and the second image forming module is an automatic document feeder scanner and configured to capture an image of a scanned object passing through the medium passage.

In summary, the flip-cover multifunctional image forming device of the present invention can not only provide two different image forming mechanisms to a user and but also ensure an entire structure and an entire operation to be reliable by the protruding border and the abutting component. Therefore, the present invention not only has flexibility in use but also has advantages of reliable structure and easy operation.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct mechanical connection. Thus, if a first device is connected to a second device, that connection may be through a direct mechanical connection, or through an indirect mechanical connection via other devices and connections.

Figure 1:
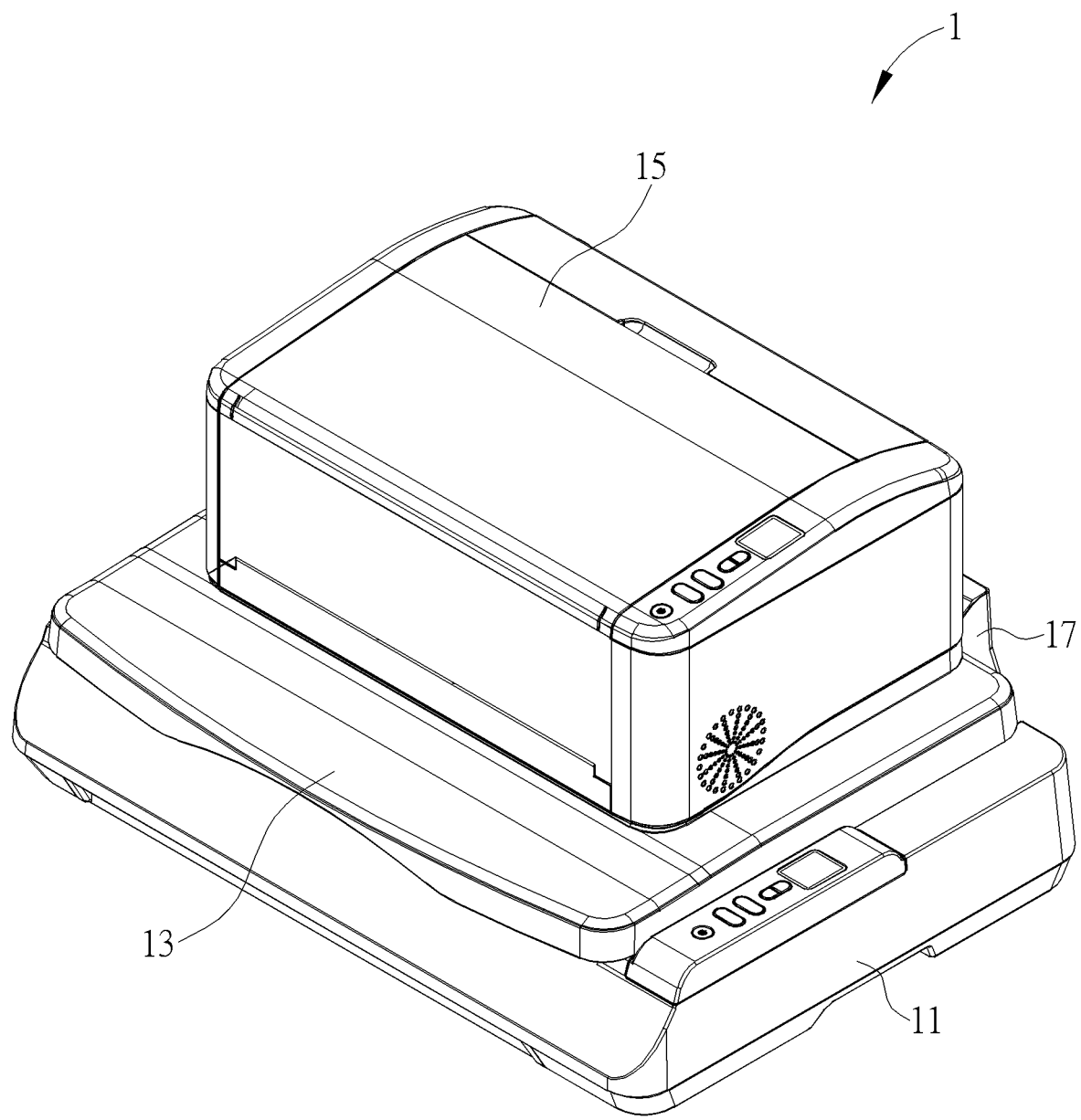
FIG. 1 and FIG. 2 are schematic diagrams of a flip-cover multifunctional image forming device at different views according to an embodiment of the present invention.
Figure 2:
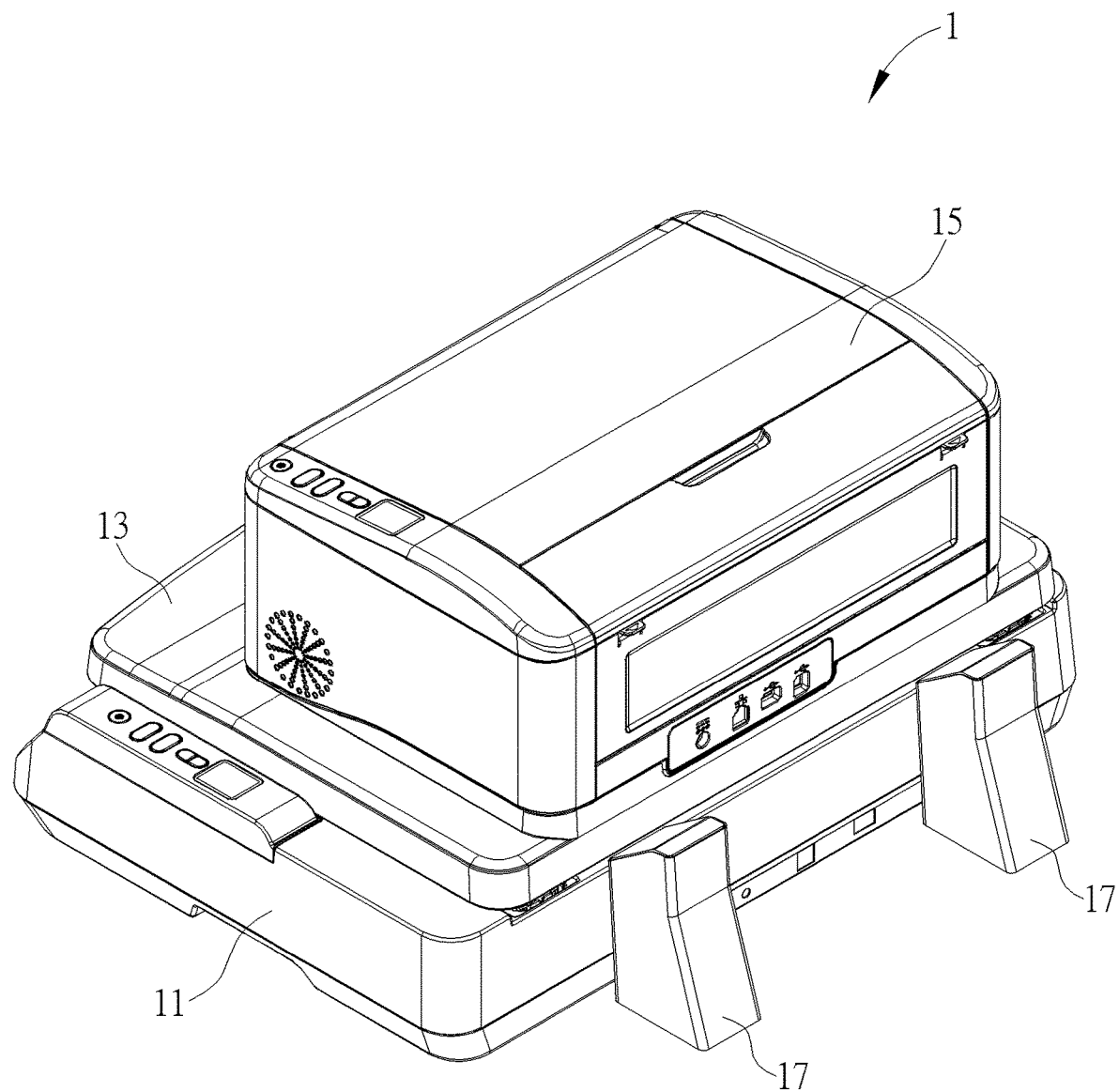
Figure 3:
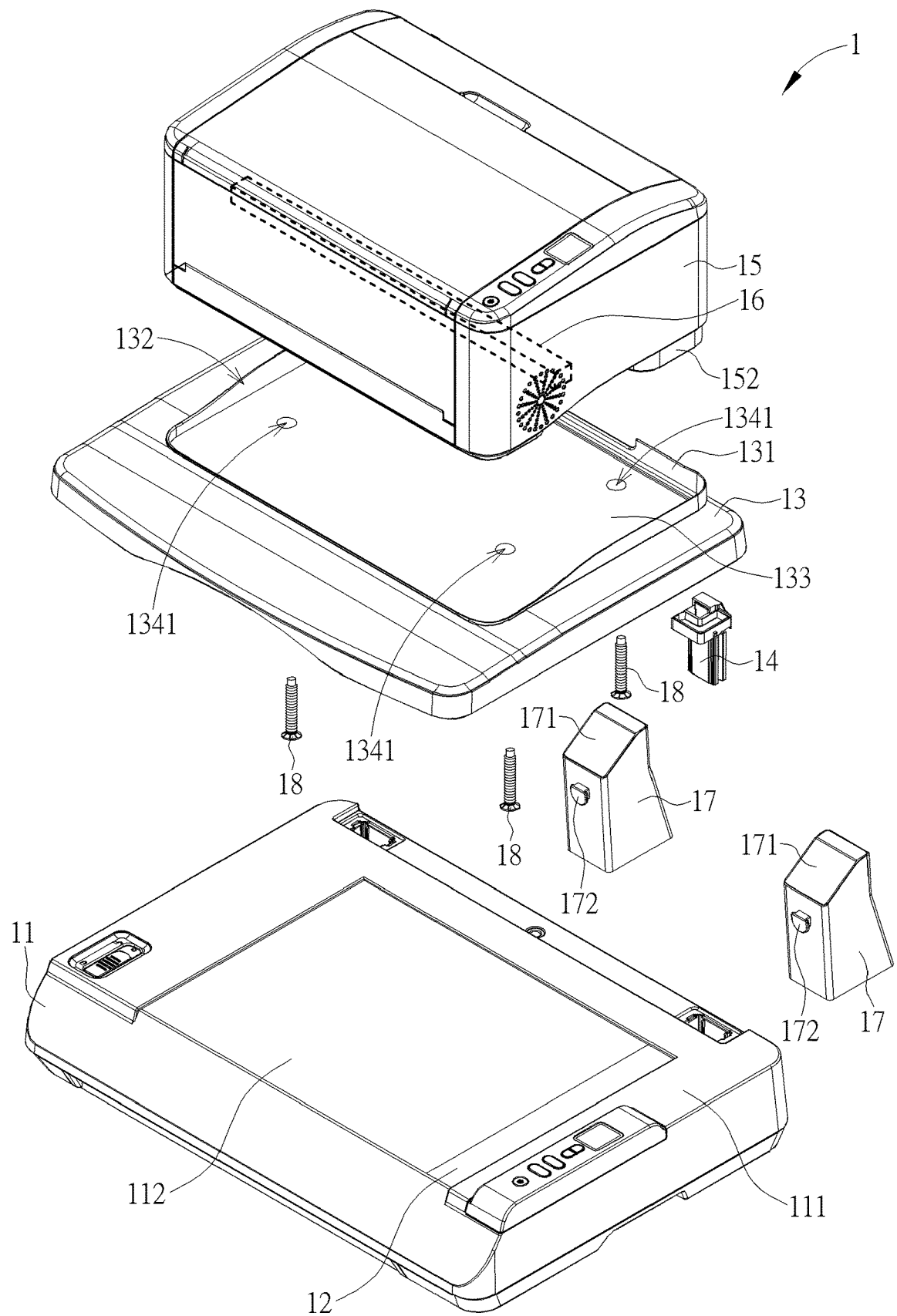
FIG. 3 and FIG. 4 are partial exploded diagrams of the flip-cover multifunctional image forming device at different views according to the embodiment of the present invention.
Figure 4:
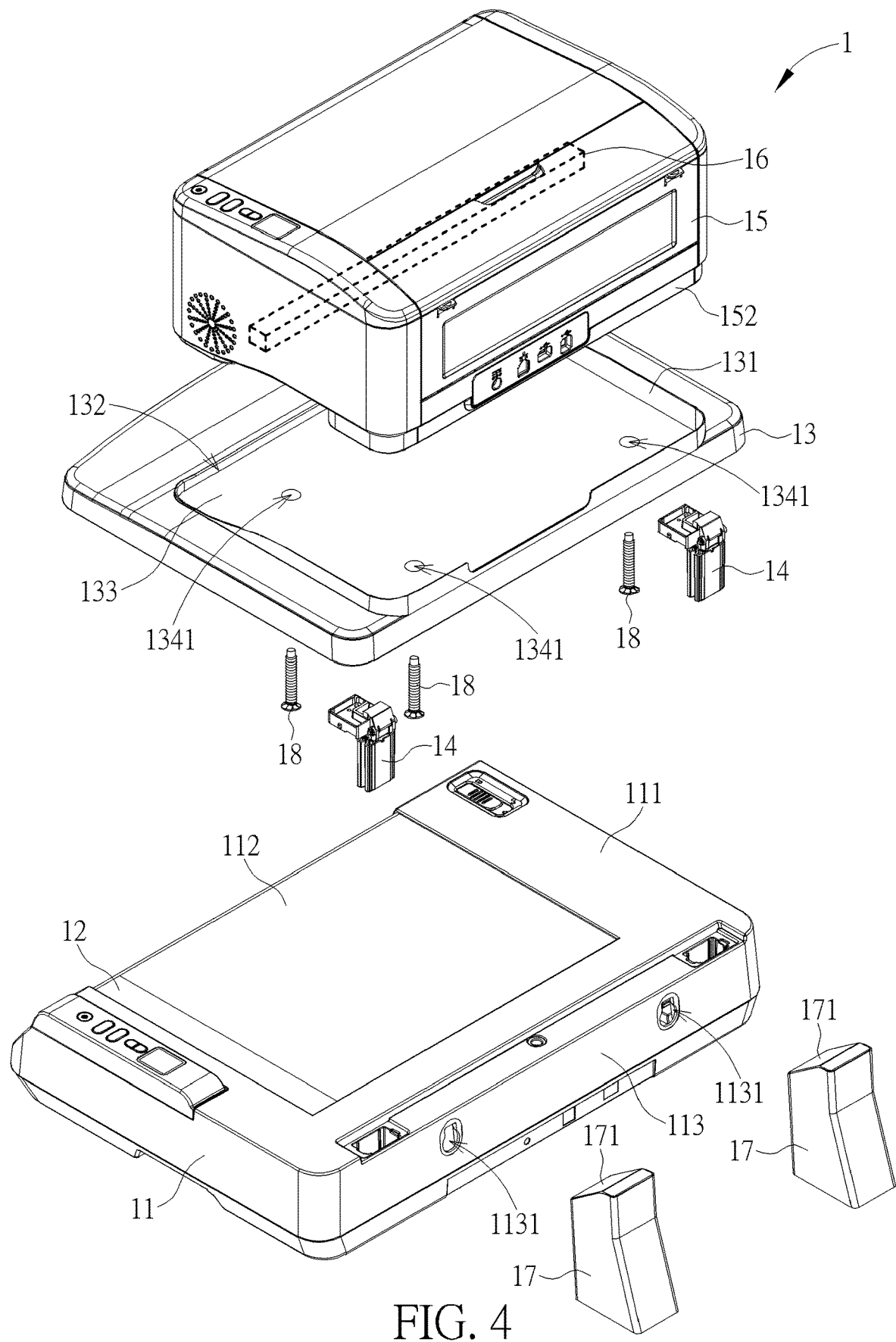
Figure 5:
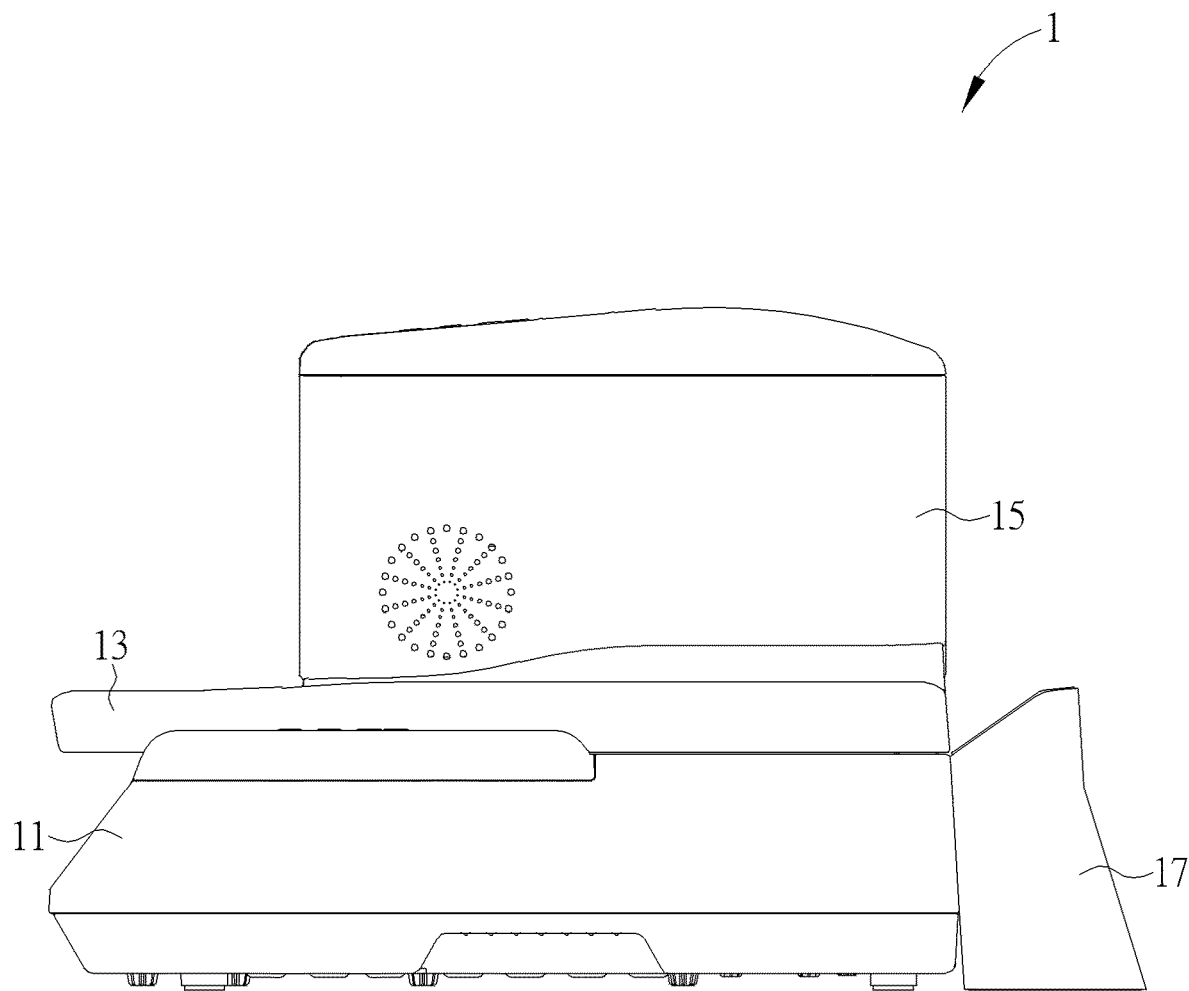
FIG. 5 and FIG. 6 are diagrams of the flip-cover multifunctional image forming device in different states according to the embodiment of the present invention.
Figure 6:
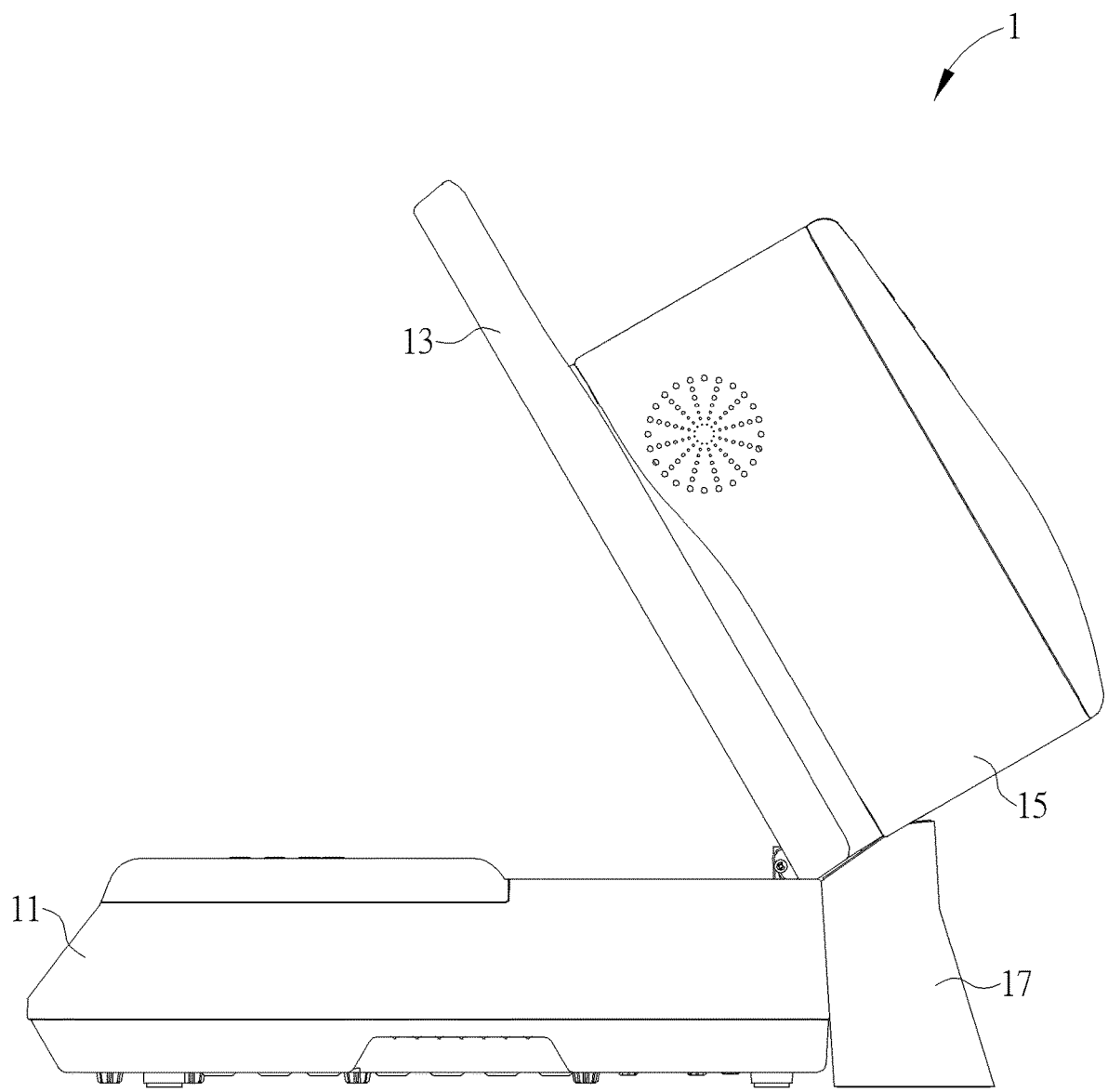

Please refer to FIG. 1 to FIG. 6. FIG. 1 and FIG. 2 are schematic diagrams of a flip-cover multifunctional image forming device 1 at different views according to an embodiment of the present invention. FIG. 3 and FIG. 4 are partial exploded diagrams of the flip-cover multifunctional image forming device 1 at different views according to the embodiment of the present invention. FIG. 5 and FIG. 6 are diagrams of the flip-cover multifunctional image forming device 1 in different states according to the embodiment of the present invention. As shown in FIG. 1 to FIG. 6, the flip-cover multifunctional image forming device 1 includes a lower body 11, a first image forming module 12, a cover body 13, two pivoting mechanisms 14, an upper body 15 and a second image forming module 16. The first image forming module 12 is disposed in the lower body 11. The two pivoting mechanisms 14 are connected to the lower body 11 and the cover body 13 and for pivoting the cover body 13 relative to the lower body 11 between a folded position as shown in FIG. 5 and an unfolded position as shown in FIG. 6. The upper body 15 is detachably disposed on a side of the cover body 13 away from the lower body 11. The upper body 15 is driven by the cover body 13 to move relative to the lower body 11 when the cover body 13 pivots relative to the lower body 11. The second image forming module 16 is disposed in the upper body 15. However, the number and the position of the pivoting mechanism of the present invention are not limited to this embodiment. For example, in another embodiment, the flip-cover multifunctional image forming device can include only one pivoting mechanism disposed at a central portion of a lateral part of the lower body and a central portion of a lateral part of the cover body.

Figure 7:
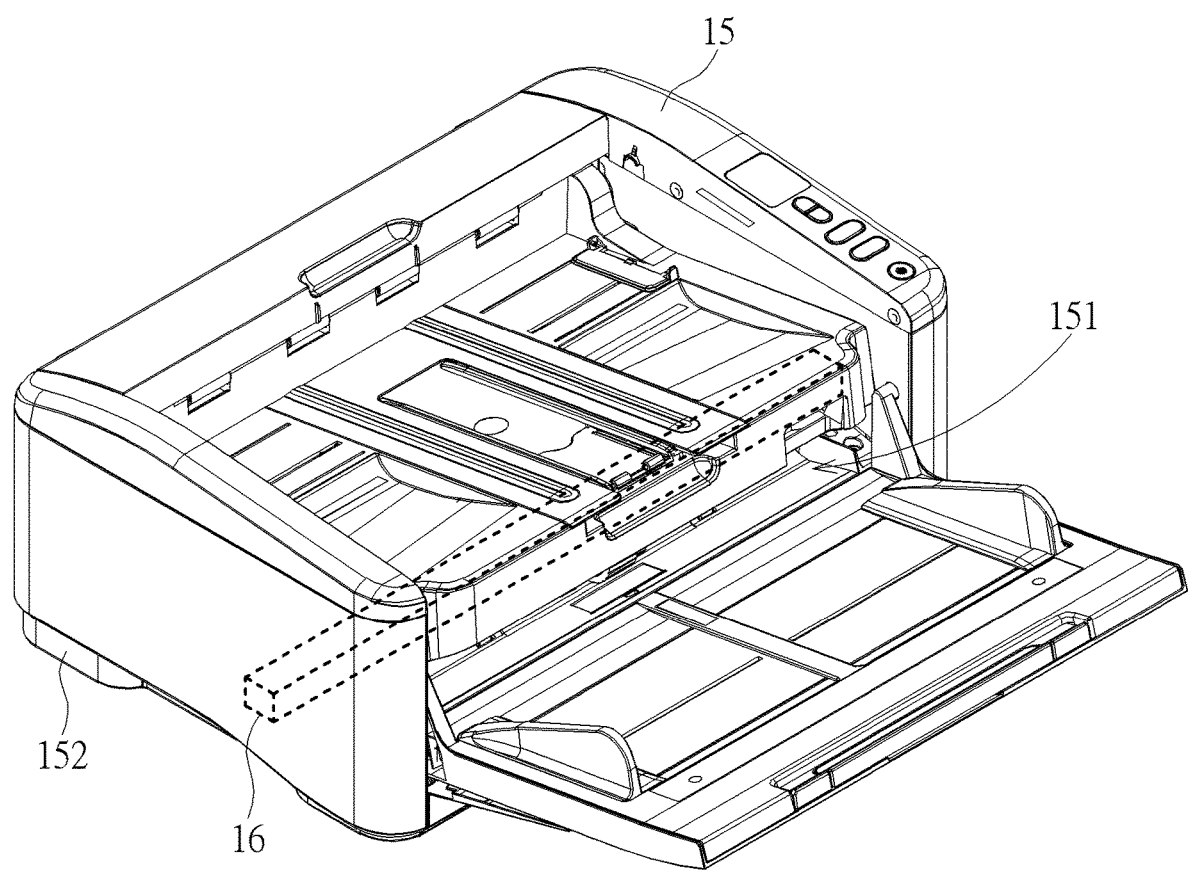
FIG. 7 is a diagram of an upper body in an in-used state according to the embodiment of the present invention.

Please refer to FIG. 3, FIG. 4 and FIG. 7. FIG. 7 is a diagram of the upper body 15 in an in-used state according to the embodiment of the present invention. As shown in FIG. 3 and FIG. 4, in this embodiment, a scanning platform 112 is formed on a top side 111 of the lower body 11 adjacent to the cover body 13. The first image forming module 12 can be a flatbed scanning module which includes a movable camera set, and configured to capture an image of a scanned object, such as a book, which is placed on the scanning platform 112. As shown in FIG. 7, a medium passage 151 is formed in the upper body 15. The second image forming module 16 can be an automatic document feeder scanning module which includes a roller set and a fixed camera set, and configured to capture an image of another scanned object, such as a sheet of paper, which is driven by the roller set to pass through the medium passage 151. Since the first image forming module 12 and the second image forming module 16 can be used for capturing images of scanned objects with different types, a user can choose a suitable one from the first image forming module 12 and the second image forming module 16, which is corresponding to a scanned object, to capture an image of the scanned object according to practical demands. For example, when the user would like to utilize the first image forming module 12 to capture an image of a first scanned object, e.g., a book, the user can pivotally unfold the cover body 13 to the unfolded position as shown in FIG. 6 and then place the first scanned object on the scanning platform 112. Afterwards, the user can pivotally fold the cover body 13 to the folded position as shown in FIG. 5 and then operate or control the first image forming module 12 to capture the image of the first scanned object. During the aforementioned image capturing process, the cover body 13 can be used as a background of the flatbed scanning module. When the user would like to utilize the second image forming module 16 to capture an image of a second scanned object, e.g., a sheet of paper, the user can switch the upper body 15 from a state as shown in FIG. 5 to a state as shown in FIG. 7 and then place the second scanned object at an entrance of the medium passage 151. Afterwards, the user can operate or control the second image forming module 16 to capture the image of the second scanned object. Therefore, the present invention has flexibility in use.

Furthermore, as shown in FIG. 1 to FIG. 6, the flip-cover multifunctional image forming device 1 further includes two abutting components 17. The two abutting components 17 are detachably disposed on a lateral side 113 of the lower body 11 adjacent to the top side 111 of the lower body 11. The two abutting components 17 abut against the upper body 15 and the cover body 13 when the cover body 13 is pivoted relative to the lower body 11 to the unfolded position as shown in FIG. 6 for positioning the upper body 15 and the cover body 13, so that the flip-cover multifunctional image forming device 1 is prevented from tipping over by a gravity of the upper body 15 due to an excessive unfolding operation of the cover body 13.

Specifically, an abutting slanted surface 171 is formed on each of the two abutting components 17. The two abutting slanted surfaces 171 abut against the upper body 15 when the cover body 13 is pivoted relative to the lower body 11 to the unfolded position as shown in FIG. 6. Furthermore, an installation protrusion 172 protrudes from each of the two abutting components 17. Two installation notches 1131 are formed on the lateral side 113 of the lower body 11. Each of the two installation protrusions 172 detachably engages with the corresponding installation notch 1131. In other words, each of the two abutting components 17 can be installed on the lower body 11 by engagement of the corresponding installation protrusion 172 and the corresponding installation notch 1131, and each of the two abutting components 17 can abut against the upper body 15 for stably positioning the upper body 15 and the cover body 13 when the cover body 13 is pivoted relative to the lower body 11 to the unfolded position as shown in FIG. 6.

However, the position and the configuration of the abutting component are not limited to this embodiment. It depends on practical demands. For example, in another embodiment, the flip-cover multifunctional image forming device can include only one abutting component which is fixedly disposed on the lateral side of the lower body and for abutting against one of the cover body and the upper body.

Figure 8:
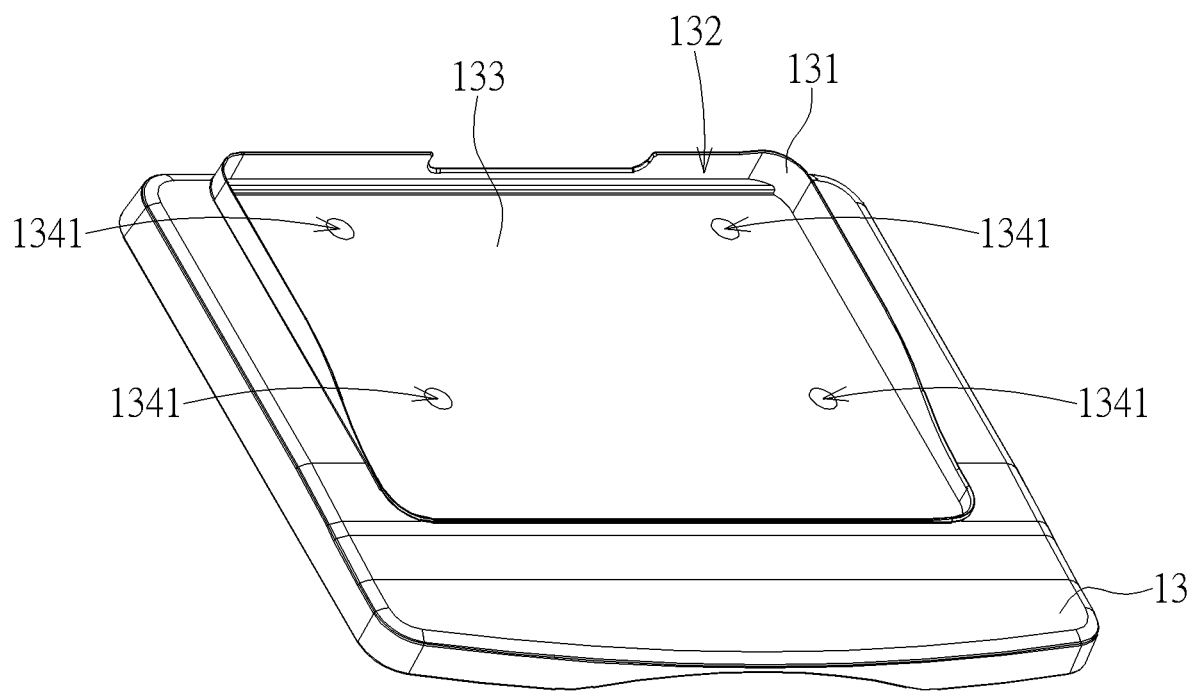
FIG. 8 and FIG. 9 are diagrams of a cover body at different views according to the embodiment of the present invention.
Figure 9:
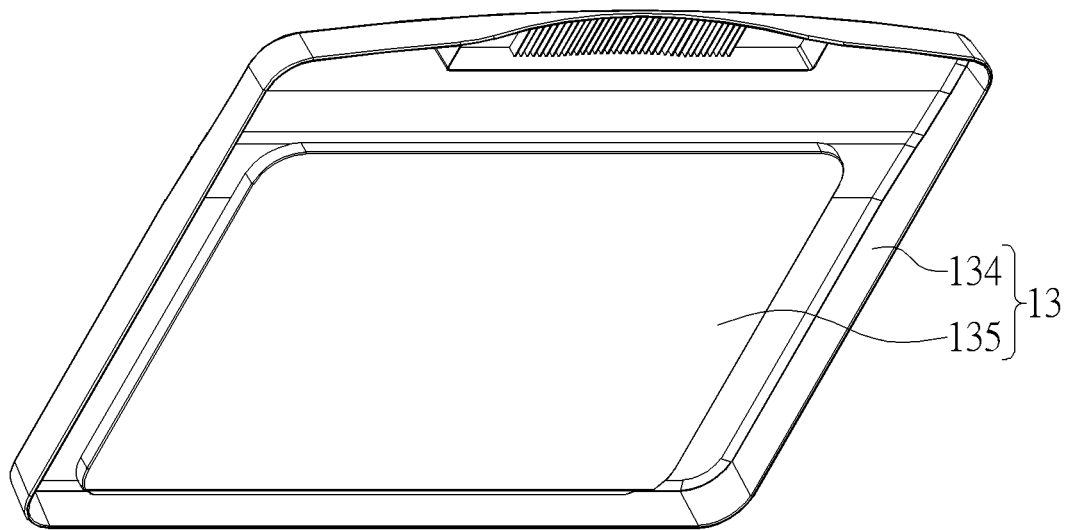

Please refer to FIG. 3, FIG. 4, FIG. 8 and FIG. 9. FIG. 8 and FIG. 9 are diagrams of the cover body 13 at different views according to the embodiment of the present invention. As shown in FIG. 3, FIG. 4, FIG. 8 and FIG. 9, a protruding border 131 is formed on the cover body 13. A restraining space 132 is enclosed by the protruding border 131 and configured to accommodate a bottom portion 152 of the upper body 15 to restrain a movement of the upper body 15 relative to the cover body 13.

Preferably, a height of a first portion of the protruding border 131 adjacent to the corresponding pivoting mechanism 14 is greater than a height of a second portion of protruding border 131 away from the corresponding pivoting mechanism 14. In other words, the protruding border 131 can preferably has a lower front end and a higher rear end. Furthermore, a recess 133 is formed on the cover body 13. The protruding border 131 is located on an outer periphery of the recess 133. The aforementioned structural configuration can ensure the upper body 15 to be properly restrained within the restraining space 132 enclosed by the protruding border 131 when the flip-cover multifunctional image forming device 1 is in a state as shown in FIG. 6. Therefore, the flip-cover multifunctional image forming device 1 of present invention has a reliable structure.

Figure 10:
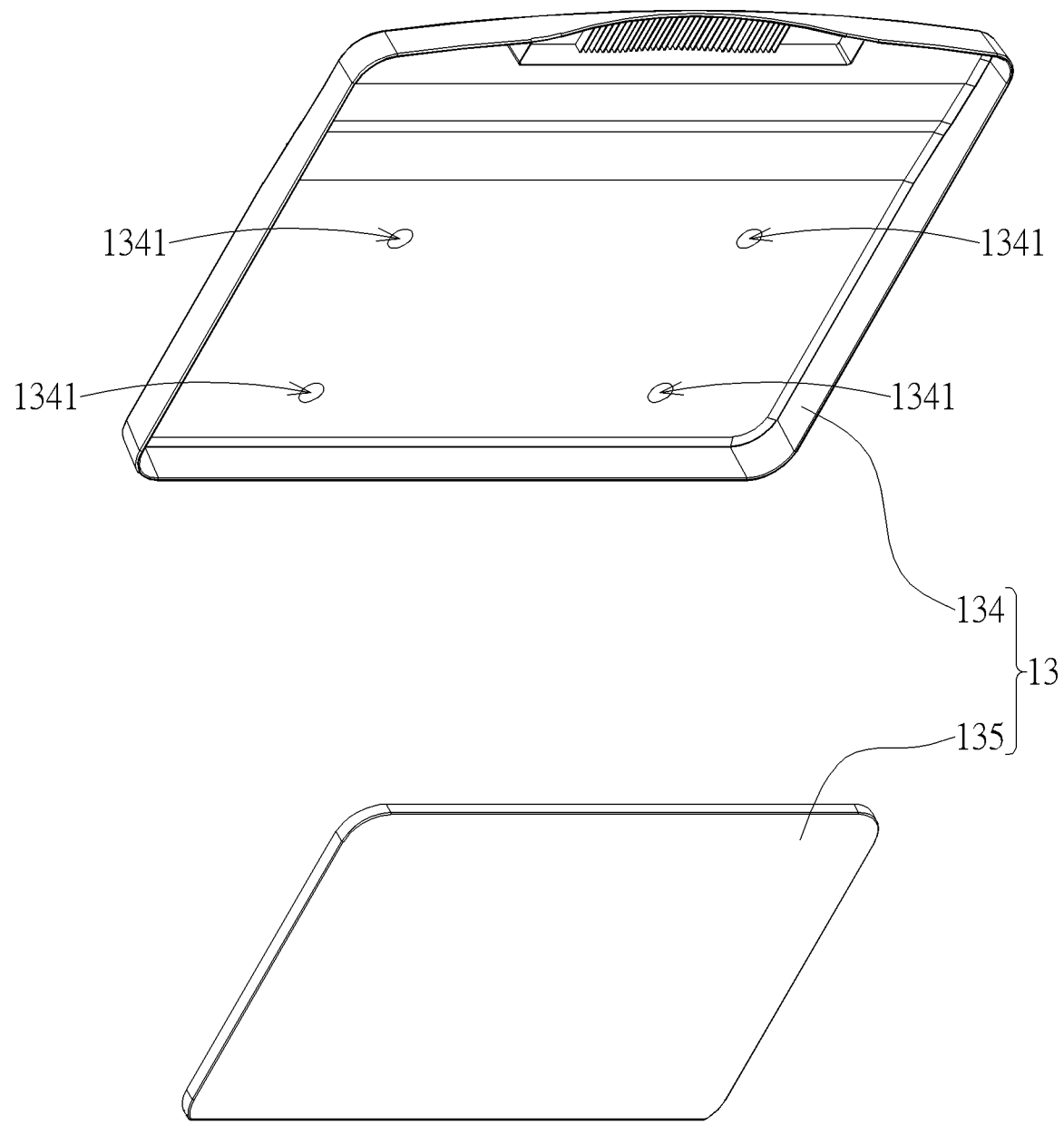
FIG. 10 is an exploded diagram of the cover body according to the embodiment of the present invention.

Please refer to FIG. 3, FIG. 4 and FIG. 8 to FIG. 10. FIG. 10 is an exploded diagram of the cover body 13 according to the embodiment of the present invention. As shown in FIG. 3, FIG. 4 and FIG. 8 to FIG. 10, the cover body 13 includes a first cover portion 134 and a second cover portion 135. The second cover portion 135 is detachably installed on a side of the first cover portion 134 adjacent to the lower body 11. For example, the second cover portion 135 can be adhesively attached onto or fastened onto the side of the first cover portion 134 adjacent to the lower body 11. In this embodiment, four through holes 1341 are formed on the first cover portion 134. The flip-cover multifunctional image forming device 1 further includes four fastening components 18. Each of the four fastening components 18 passes through the corresponding through hole 1341 to fasten the upper body 15 onto a side of the first cover portion 134 away from the lower body 11 for preventing separation of the upper body 15 and the cover body 13 caused by an external force. Therefore, the flip-cover multifunctional image forming device 1 of present invention has a reliable structure. However, the numbers and the positions of the fastening component and the through hole are not limited to this embodiment. It depends on practical demands. For example, in another embodiment, there can be only one through hole formed on a central portion of the first cover portion, and the flip-cover multifunctional image forming device can include only one fastening component for passing through the through hole.

Furthermore, in this embodiment, the second cover portion 135 covers the four through holes 1341 and the four fastening components 18 when the second cover portion 135 is installed on the side of the first cover portion 134 adjacent to the lower body 11. Therefore, the flip-cover multifunctional image forming device 1 has an improved visual aesthetics.

Besides, since the second cover portion 135 is located at the side of the first cover portion 134 adjacent to the lower body 11, the second cover portion 135 can be used as a background plate when the first image forming module 12 captures images. The user can replace different second cover portion 135 with different colors according to practical demands. Therefore, the present invention has flexibility in use.

In addition, as mentioned above, the first image forming module 12 and the second image forming module 16 can be respectively the flatbed scanning module and the automatic document feeder scanning module. However, the present invention is not limited to this embodiment. For example, in another embodiment, the first image forming module and the second image forming module can be respectively the flatbed scanning module and a printing module which is used for forming an image onto a printed medium, e.g., a sheet of paper.

In contrast to the prior art, the flip-cover multifunctional image forming device of the present invention can not only provide two different image forming mechanisms to a user and but also ensure an entire structure and an entire operation to be reliable by the protruding border and the abutting component. Therefore, the present invention not only has flexibility in use but also has advantages of reliable structure and easy operation.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A flip-cover multifunctional image forming device comprising:
    a lower body;
    a first image forming module disposed in the lower body;
    a cover body comprising a first cover portion and a second cover portion detachably installed on a side of the first cover portion adjacent to the lower body, at least one through hole being formed on the first cover portion, the second cover portion covering the at least one through hole when the second cover portion is installed on the side of the first cover portion adjacent to the lower body;
    at least one fastening component passing through the at least one through hole to fasten the upper body onto a side of the first cover portion away from the lower body and the second cover portion;
    at least one pivoting mechanism connected to the lower body and the cover body and for pivoting the cover body relative to the lower body between a folded position and an unfolded position;
    an upper body detachably disposed on a side of the cover body away from the lower body, the upper body being driven by the cover body to move relative to the lower body when the cover body pivots relative to the lower body; and
    a second image forming module disposed in the upper body.

2. The flip-cover multifunctional image forming device of claim 1, wherein a protruding border is formed on the cover body, and a restraining space is enclosed by the protruding border and configured to accommodate a bottom portion of the upper body to restrain a movement of the upper body relative to the cover body.

3. The flip-cover multifunctional image forming device of claim 2, wherein a height of a first portion of the protruding border adjacent to the at least one pivoting mechanism is greater than a height of a second portion of protruding border away from the at least one pivoting mechanism.

4. The flip-cover multifunctional image forming device of claim 3, wherein a recess is formed on the cover body, and the protruding border is located on an outer periphery of the recess.

5. The flip-cover multifunctional image forming device of claim 2, wherein a recess is formed on the cover body, and the protruding border is located on an outer periphery of the recess.

6. The flip-cover multifunctional image forming device of claim 1, further comprising at least one abutting component detachably disposed on a lateral side of the lower body, and the at least one abutting component abutting against the upper body or the cover body when the cover body is pivoted relative to the lower body to the unfolded position.

7. The flip-cover multifunctional image forming device of claim 6, wherein an abutting slanted surface is formed on the at least one abutting component, and the abutting slanted surface abuts against the upper body when the cover body is pivoted relative to the lower body to the unfolded position.

8. The flip-cover multifunctional image forming device of claim 6, wherein an installation protrusion protrudes from the at least one abutting component, an installation notch is formed on the lateral side of the lower body, and the installation protrusion detachably engages with the installation notch.

9. The flip-cover multifunctional image forming device of claim 1, wherein a scanning platform is formed on a side of the lower body adjacent to the cover body, and the first image forming module is a flatbed scanner and configured to capture an image of a scanned object placed on the scanning platform.

10. The flip-cover multifunctional image forming device of claim 9, wherein a medium passage is formed in the upper body, and the second image forming module is an automatic document feeder scanner and configured to capture an image of a scanned object passing through the medium passage.

11. The flip-cover multifunctional image forming device of claim 1, wherein a medium passage is formed in the upper body, and the second image forming module is an automatic document feeder scanner and configured to capture an image of a scanned object passing through the medium passage.

* * * * *